US000001270H

United States Statutory Invention Registration [19]

[11] Reg. Number: H1270

Rawls

[43] Published: Jan. 4, 1994

[54] DEBURRING APPARATUS

[75] Inventor: Robert C. Rawls, Ballston Lake, N.Y.

[73] Assignee: The United States of America as represented by the Secretary of the Army, Washington, D.C.

[21] Appl. No.: 80,978

[22] Filed: Jan. 25, 1993

Related U.S. Application Data

[63] Continuation of Ser. No. 825,366, Jan. 24, 1992, abandoned.

[51] Int. Cl.[5] ..... B24B 19/04

[52] U.S. Cl. ..... 51/7; 51/17

[58] Field of Search ..... 51/411, 7, 317, 318, 51/328, 290, 17; 15/395, 345; 134/167C, 166C, 169C

[56] References Cited

U.S. PATENT DOCUMENTS

| | | | |
|---|---|---|---|
| 3,800,358 | 4/1974 | Ryan | 15/395 |
| 4,713,882 | 12/1987 | Bianchi | 51/411 |
| 5,012,620 | 5/1991 | McNeil | 51/7 |
| 5,033,545 | 7/1991 | Sudol | 134/167 C |
| 5,057,174 | 10/1991 | Anderson | 51/411 |
| 5,160,548 | 11/1992 | Boisture | 51/319 |

FOREIGN PATENT DOCUMENTS

| | | | |
|---|---|---|---|
| 223372 | 5/1987 | European Pat. Off. | 51/424 |
| 948645 | 8/1982 | U.S.S.R. | 51/7 |
| 1015936 | 5/1983 | U.S.S.R. | 134/167 C |
| 1355464 | 11/1987 | U.S.S.R. | 51/290 |

*Primary Examiner*—Harold J. Tudor

*Attorney, Agent, or Firm*—Anthony T. Lane; Edward Goldberg; Michael Sachs

[57] ABSTRACT

The disclosure is of apparatus and method for deburring the inner surface of a metal tube by inserting a tubular structure into the metal tube and flowing an abrasive medium along a path over the area to be deburred and out of the metal tube.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEBURRING APPARATUS

The invention described herein may be manufactured, used and licensed by or for the Government of the United States for governmental purposes without the payment of any royalties thereon.

This application is a continuation of application Ser. No. 07/825,366, filed Jan. 24, 1992, now abandoned.

BACKGROUND OF THE INVENTION

In the manufacture of a weapon having a bore such as a rifle, lands are formed inside the barrel and it is generally necessary to remove sharp edges from the rifling lands at the origin of the bore. It is also necessary to provide the required radius of the rifling lands.

One method of removing sharp edges from rifling lands at the origin of the bore is known as a whipping procedure. In this procedure, emery paper is secured to a metal rod which is coupled to an electric drill for turning the rod. The rod is inserted in the barrel and the emery paper is rotated at the rifling land to provide the desired smoothing. This method is unsatisfactory because it is time consuming and does not perform the required radiusing of the lands.

SUMMARY OF THE INVENTION

The apparatus of the invention includes means for passing an abrasive fluid through a bore with such control that uniform smoothing of lands and uniform radiusing are achieved.

DESCRIPTION OF THE DRAWINGS

The drawing is a side sectional elevational view of apparatus embodying the invention.

DESCRIPTION OF THE INVENTION

Figure 1:
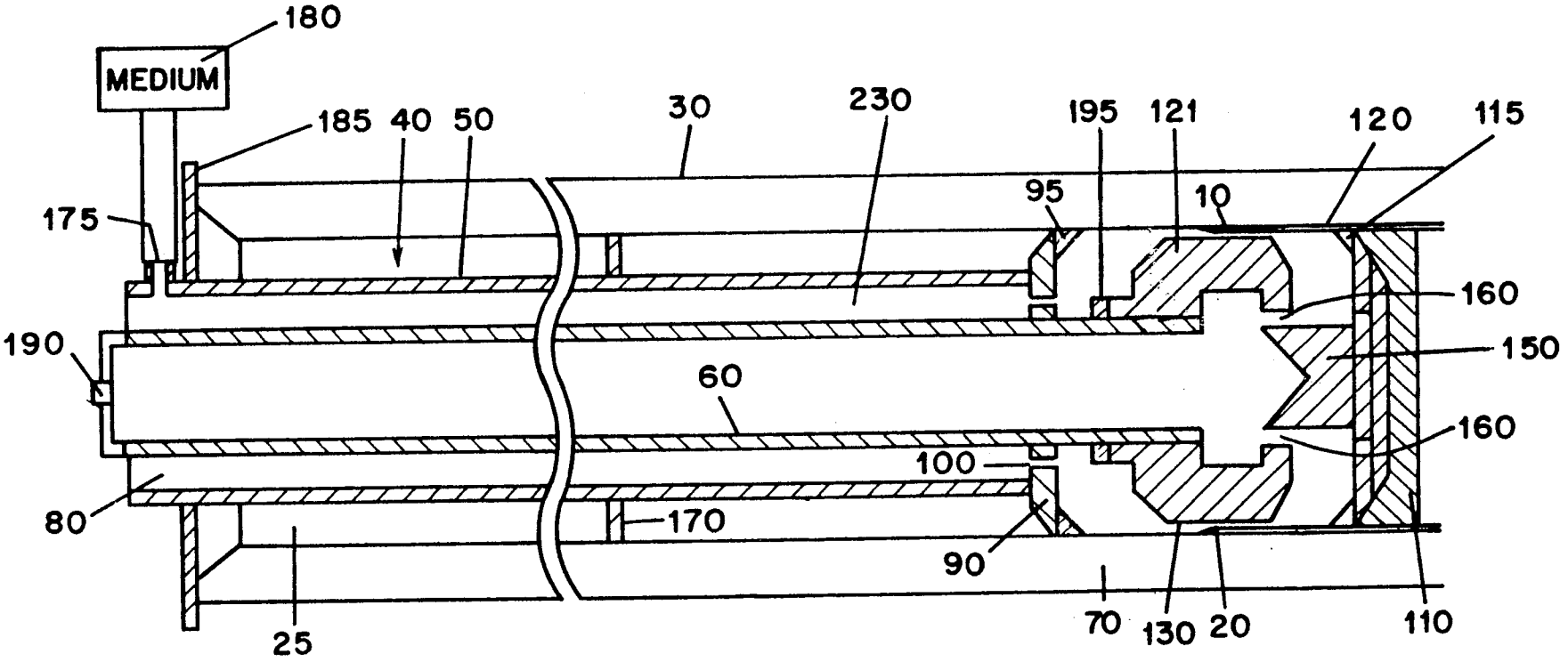

The apparatus of the invention is used to smooth burrs on rifling lands 10 and to radius the lands in the origin of the bore 20 of a rifle or similar weapon 30. The deburring apparatus 40 is a tubular member which includes an annular outer tube 50 and a central tube 60 and is adapted to be inserted into the bore of the weapon to be deburred and radiused. The terms "radius" is used occasionally as a verb throughout this application, as in "to radius" a tube, or "radiusing" e.g. The meaning is to smoothly round sharp edges here for example in a precision way, to a particular (diameter) radius. The application given here is to smooth out the sharp edges of a rifling pattern (like internal threads) cut into the bore of a weapon. The space 230 between outer tube 50 and central tube 60 provides a path for a fluid medium as will be explained below. The deburring apparatus has a front end 70 and a rear end 80.

The rear end 80 of the deburring apparatus 40 which is adapted to be positioned adjacent to the rifling lands to be radiused includes a first annular wall and mechanical seal 90 at which the outer annular tube 50 terminates and through which the inner central tube 60 passes. The mechanical seal 90 includes a plurality of apertures 100 which are in communication with the outer annular tube 50. The mechanical seal wall or connector 90 includes an annular sealing ring 95 secured to its rear surface. The sealing ring has a diameter such that it fits snugly in the powder chamber 25 of the weapon.

Spaced from the mechanical seal 90 is a front seal assembly which includes second annular wall or plate 110, of a diameter to fit snugly in the weapon bore. The front seal assembly also includes an annular gasket 115 disposed against the surface of plate 110 which faces wall 90.

Between the first and second walls 90 and 110 is placed a part 120 known as a medium compression head. This compression head is generally annular and includes a central bore into which the central tube 60 extends in a tight fit. The annular member 120 has a central portion 121 of a diameter such that its outer wall 130 is disposed suitably close to the wall of the weapon bore at the rifling lands 10 to be radiused. The annular member or compression head 120 includes a first annular portion 121 and a second annular portion 150 on either side thereof. The first annular portion 121 is spaced a small distance from the seal wall 90 and the second annular portion 150 bears against the seal wall or plate 110. Where the central portion 121 of annular member 120 meets the second annular portion 150, it is provided with a plurality of apertures 160 arrayed in an annular pattern which communicate with the bore of the annular member 120 and the central tube 60. The annular portion 121 is sealed to the central tube 60 by a sealing means 195.

In operation of the deburring apparatus 40, the apparatus 40 is inserted in the bore of the weapon having rifling lands to be deburred and radiused with the central portion 121 of the annular member 120 disposed at the rifling lands. The apparatus 40 is supported and centered by annular guides 170 disposed along its length, as required. A source 180 of an abrading medium comprised of a carbide silicone based material impregnated with various size grains of carbide chips is provided and is coupled by suitable hosing to the quick release connector 175 secured to annular outer tube 50 and the central tube 60 so that the medium can flow into the central tube. Suitable hosing is also connected to a quick release connector 190 provided on central tube 60. The fluid medium flows, under pressure, down the annular tube 50, through the apertures 100 in the wall 90 along the outer surface 130 of the annular member 120 and across the rifling lands 10 and through the apertures 160 in the second annular 150 and into the central tube 60 and out 190, thereafter back to the source 180 of the fluid medium (fluid recycling recovery mechanism not shown). This operation is continued until the rifling lands are properly radiused. Normally, this operation can be completed in a time of the order of four to six hours.

All parts of the deburring apparatus 40 are preferably of aluminum except for certain parts which are of hardened steel where required. The annular compression head 120 is treated to a 0.0005 hardcoating. A plate 185 serves to support the deburring apparatus in general, and further serves to support the apparatus for insertion into the tube for the deburring operation.

What is claimed is:

1. Device for cutting and smoothing surfaces and edges of the interior lands (10) of a metal gun barrel tube by action of abrasive liquid, comprising:

first insertable cylindrical tubular means (50) sized to fit essentially within said metal gun barrel tube (30), and a first flange means (90) attached on one end of said first tubular means, sealed with a ring means (95) to prevent liquid from entering any of the space (25) between the first tubular means (50) and the barrel tube (30); and second insertable cylindrical tubular means (60) concentrically positioned within said first tubular means (50), sized so that there is an open annular passageway (230) between said first and second tubular means mounted through a hole in said first flange means (90); and a plate means (110) fitted on one end of said barrel (30) to seal it to contain liquid;

a liquid pressure head attachment (120) fitted to the end of said second tubular means (60), said end terminating, and said pressure head (120) located in, the space between said first flange means (90) and said plate means (110);

apertures (100) in said flange means to permit liquid to pass out from said open annular passageway between said first and second tubular means;

means (180) located at the end of said respective first and second tubular means opposite said plate means for pumping abrasive liquid under pressure into said open annular passageway (130) between said first and said second tubular means, said first and second tubular means being both sealed at their respective ends opposite the said plate means (110) to prevent the escape of liquid at those respective ends;

whereby said abrasive liquid is pumped through said passageway (130) between said first and said second tubular means, through said aperture (100) into the space bounded between said flange (90) and said plate (110) and the inside of the barrel (30) around said pressure head (120) to abrade but not to deform the inside of the barrel (30) at the location of lands (10) within the barrel which require smoothing then inside the pressure head into the second tubular means (60), said second tubular mean having a further means (190) for bleeding out the abrasive liquid therefrom.

2. The device of claim 1, wherein the pressure head (120) is comprised of an annular cylindrical head piece (121) sealed to said second tubular means (60) by a sealing means (195) and further including a pressure portion (150) which is attached to plate (110) between head piece (121) and said plate (110).

3. The device of claim 1 wherein said first tubular means (50) is supported within said gun barrel (30) by a support structure (170).

* * * * *